Figure 15:
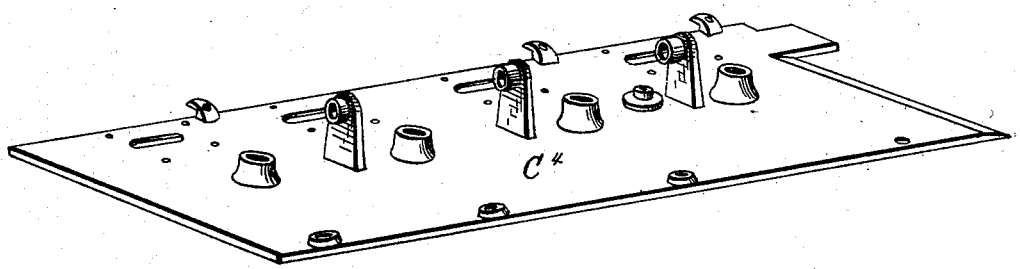
Figure 16:
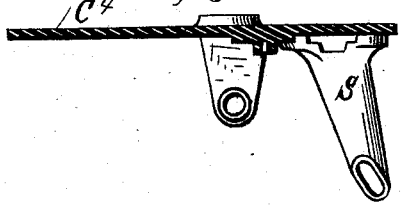

(Model.)
J. D. OTSTOT & A. R. LUDLOW.
Grain Drill.
No. 238,149.  Patented Feb. 22, 1881.
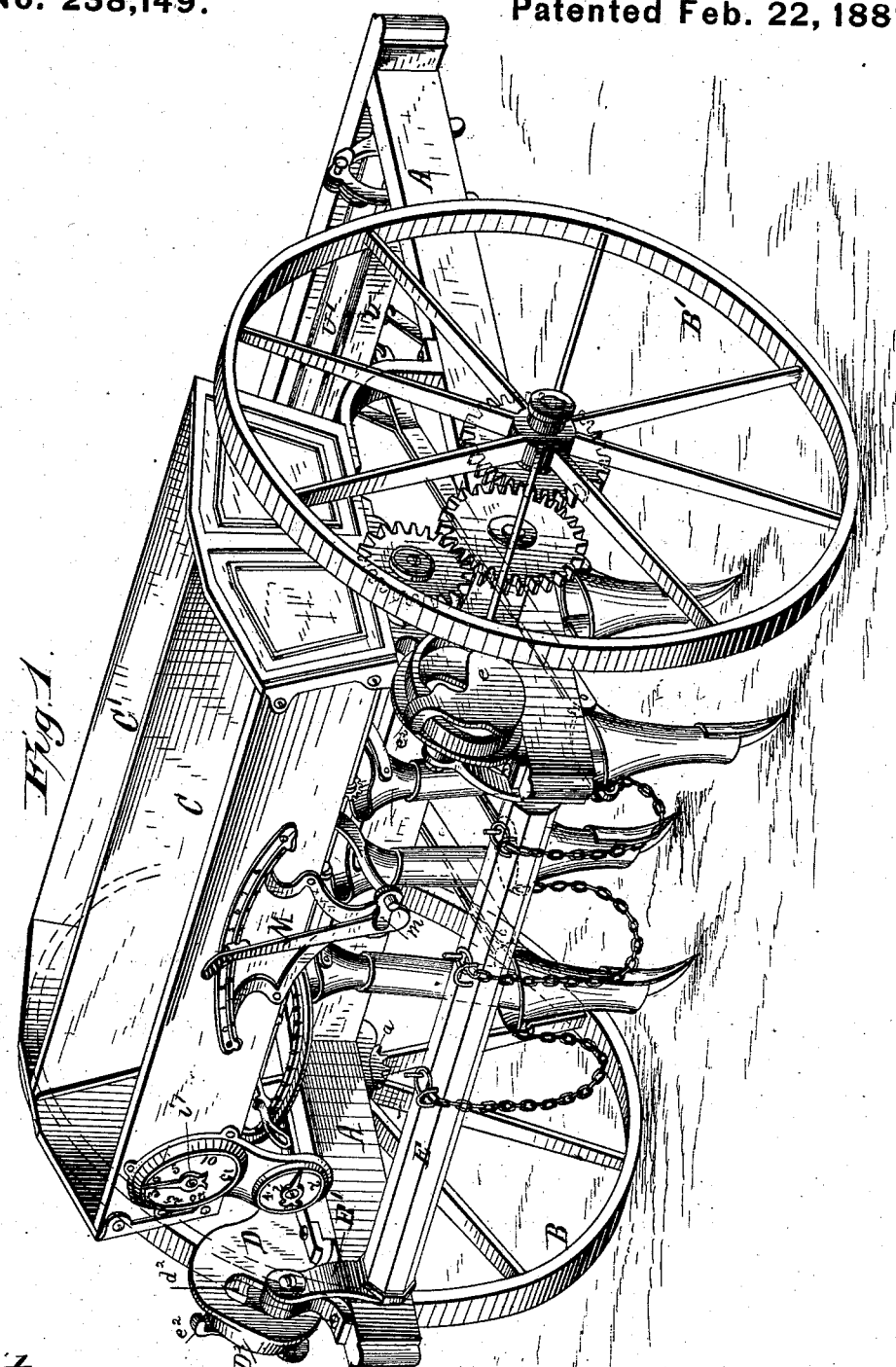
Witnesses:
Franck L. Ouraud
Alex Mahin
Inventors:
John D. Otstot
Abraham R. Ludlow
by A. M. Smith
Atty.

(Model.)
5 Sheets—Sheet 2.
J. D. OTSTOT & A. R. LUDLOW.
Grain Drill.
No. 238,149.  Patented Feb. 22, 1881.
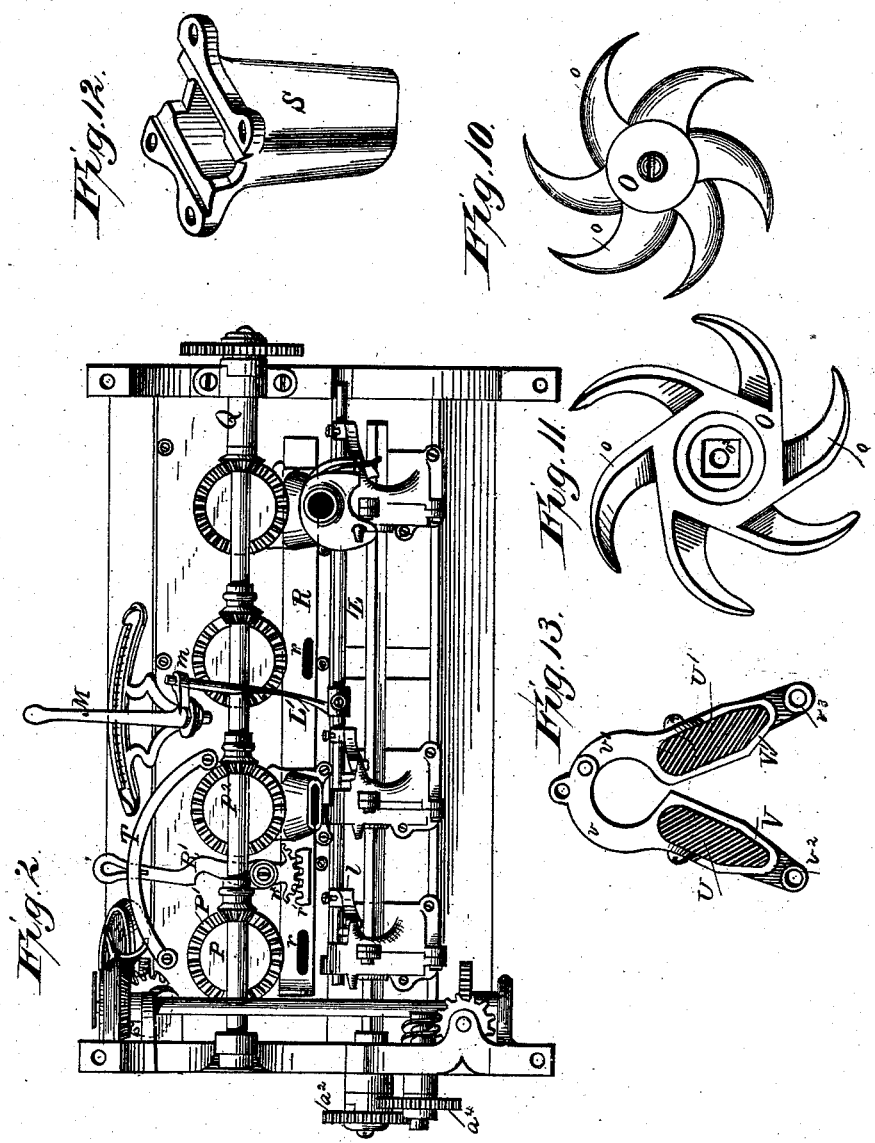
Witnesses
Franck L. Ourand
Alex Mahon
Inventors,
John D. Otstot
Abraham R. Ludlow
by A. M. Smith,
Attorney

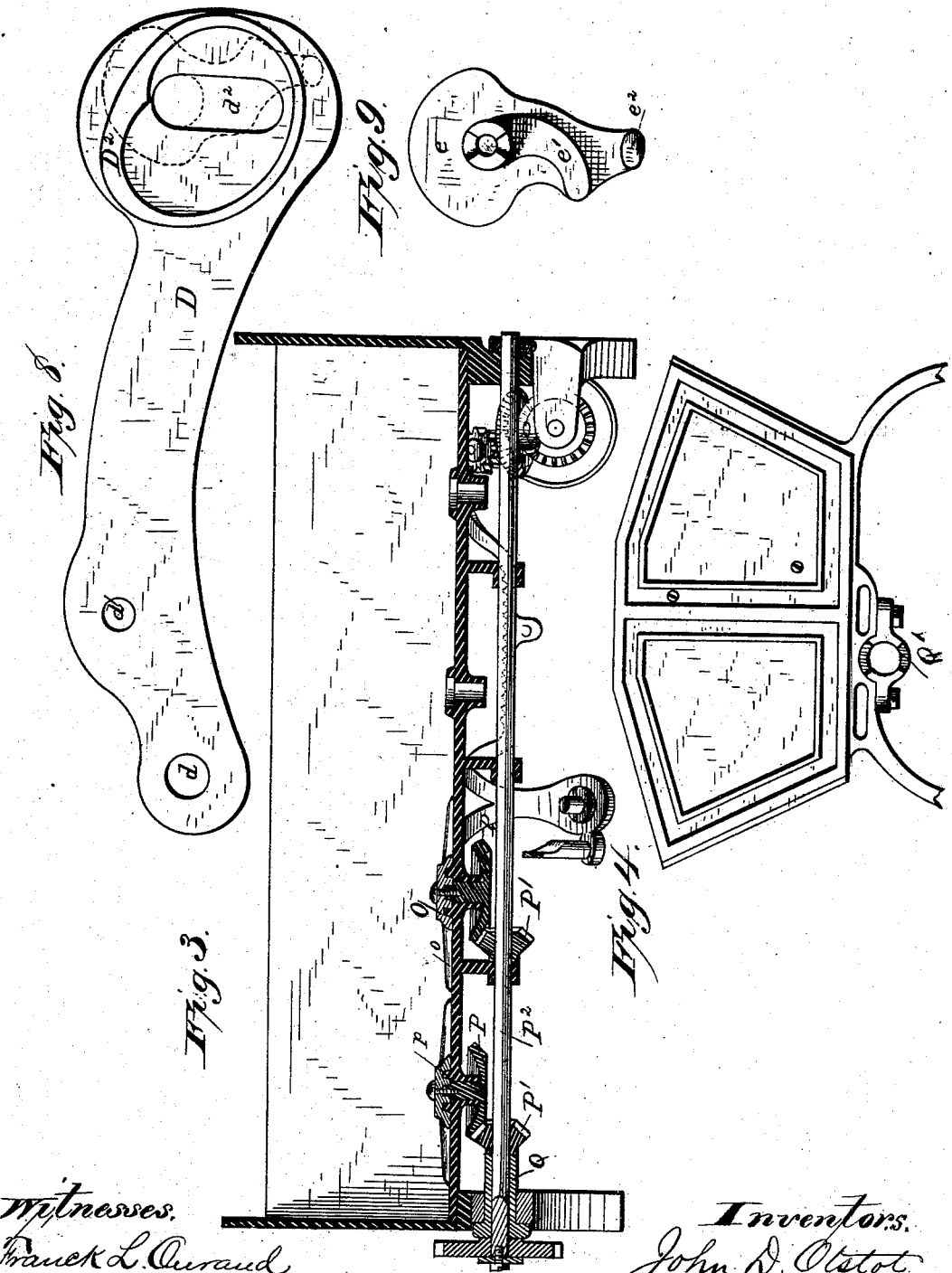

(Model.)
J. D. OTSTOT & A. R. LUDLOW.
Grain Drill.
No. 238,149.  Patented Feb. 22, 1881.
5 Sheets—Sheet 4.
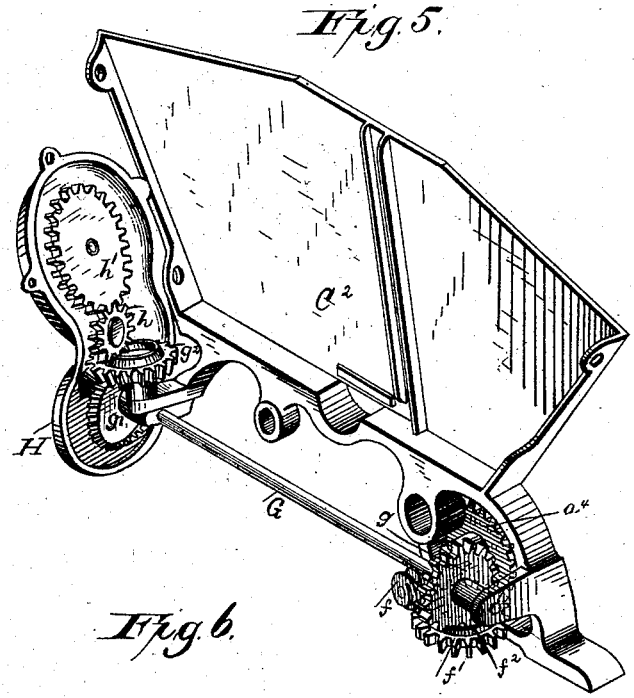
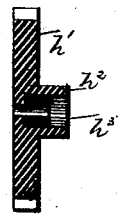
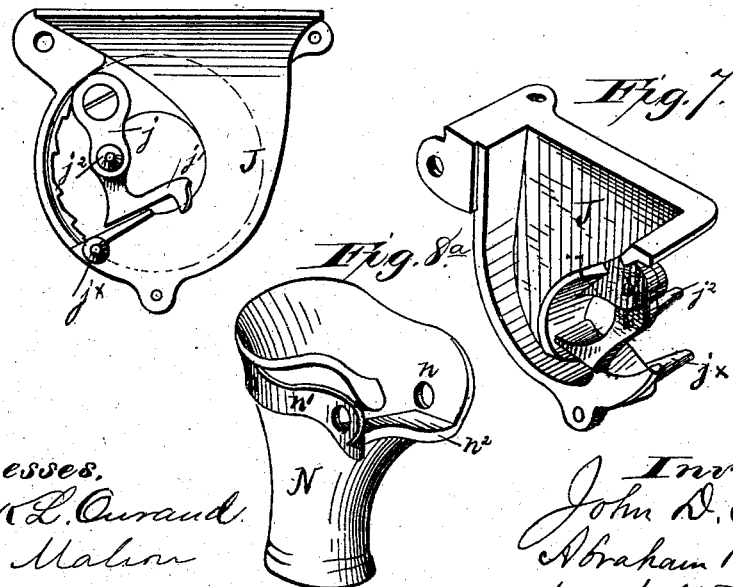

(Model.) 5 Sheets—Sheet 5.

J. D. OTSTOT & A. R. LUDLOW.
Grain Drill.

No. 238,149. Patented Feb. 22, 1881.

Witnesses.
Franck L. Ourand
Alex Mahon

Inventors,
John D. Otstot
Abraham R. Ludlow
by S. M. Smith
atty.

N. PETERS, PHOTO-LITHOGRAPHER, WASHINGTON, D. C.

UNITED STATES PATENT OFFICE.

JOHN D. OTSTOT AND ABRAHAM R. LUDLOW, OF SPRINGFIELD, OHIO.

GRAIN-DRILL.

SPECIFICATION forming part of Letters Patent No. 238,149, dated February 22, 1881.

Application filed August 27, 1880. (Model.)

*To all whom it may concern:*

Be it known that we, JOHN D. OTSTOT and ABRAHAM R. LUDLOW, of Springfield, county of Clarke, State of Ohio, have invented a new and useful Improvement in Grain-Drills, of which the following is a full, clear, and exact description, reference being had to the accompanying drawings, making part of this specification, in which—

Figure 1 is a perspective view of a grain-drill with our improvements applied. Fig. 2 is a bottom view of the same in part. Fig. 3 is a vertical longitudinal section through the fertilizer-hopper, showing the arrangement of parts for discharging the fertilizer. Fig. 4 is an end view of the hopper. Fig. 5 is a perspective view of the inner side of the hopper end plate and of the gearing for actuating the land-measure; and Figs. 6, 7, 8, 8$^a$, 9, 10, 11, 12, 13, 14, 15, and 16 are detail views hereinafter referred to.

The invention relates, first, to a novel construction and arrangement of devices for measuring and registering the quantity of land seeded; second, to a novel construction of the main journal-box or sleeve-bearing to the fertilizer-shaft, through which the power is transmitted from the driving to the fertilizer gears; third, to a novel construction of the hopper ends, so as to allow the fertilizer-bottom, with its shaft, to be removed without displacing its parts; fourth, to a novel construction of the tube-tops for limiting their throw or adjustment, and thereby preventing the kinking of the tubes or conductor-spouts, and the consequent interference with or stoppage of the discharge of the seed; fifth, to a novel construction of the fertilizer-hopper bottom, and to the means connected therewith for effecting and regulating the discharge of the fertilizer; sixth, to the construction of the yoke and cam for actuating the gear-levers; and, lastly, to the means for adjusting and holding the rocking bars to which the drag-bars are attached, whereby the hoes can be adjusted to and held in any desired position, all as hereinafter described.

The machine, in its general organization, is similar to those now in use, as represented in the perspective view, Fig. 1, and need therefore be described only so far as is necessary to an understanding of our improvements.

In the accompanying drawings, A represents the main frame; B B', the carrying and driving wheels; C C', the grain and fertilizer hoppers, said parts, except in details hereinafter described, being of the usual or any preferred construction and arrangement.

D D' are the gear-levers, pivoted and made adjustable upon the main drive-wheel axle as a center, and one of which, D, carries a transmitting-gear, through which motion is imparted from a spur-gear, $a$, connected to and turning with the driving-wheel B, to a spur-gear, $a^2$, on the grain-distributer shaft, the other, D', carrying the transmitting-gear, through which motion is imparted in a similar manner to the fertilizer-distributer shaft. The form of these gear-levers is shown in Fig. 8, $d$ representing the eye or sleeve through which it is connected with the main drive-wheel axle, and $d'$ the pin or stud-shaft on which the transmitting-gear is mounted. Upon this same shaft $d'$ is mounted a second transmitting-gear, through which motion is imparted to the land-measuring devices, as hereinafter described. The levers D D' are made of metal, and are provided at their outer swinging ends each with an irregular annular flange, D$^2$, projecting from the outer face or wall of the lever, and forming a yoke having an eccentric arrangement to a slightly curved and nearly vertical slot, $d^2$, formed in the lever near its outer end, as shown in Figs. 1 and 8. The pivots of the lifting-roller E, or of the crank-arms E', on which said roller is rocked, pass through these slots $d^2$, and have cam-plates $e$ secured to them by means of bolts or set-screws, which permit their adjustment relative to the lifting-roller, said plates being provided each with a cam-projection, $e'$, and a pin or spur, $e^2$, on its inner face, the former moving in contact with the inner wall of the flange or yoke D$^2$, and the latter, $e^2$, in contact with the outer wall of said flange. By this arrangement it will be seen that a positive movement is imparted by the cam-plate to the gear-levers when the lifting-roller is vibrated for raising or lowering the drill-teeth, said motion being utilized for throwing the distributing devices into and out of action in the usual way.

The second transmitting-pinion above referred to, when the distributing-wheel shaft is in gear, engages with and drives a spur-gear, $a^4$, (see Figs. 2 and 5,) secured to a shaft mounted in a sleeve-bearing in the hopper end $C^2$, the inner end of said shaft being provided with a worm, $f$, which drives a worm or spur wheel, $f'$, mounted on a vertical pin or stud on a horizontal arm of the hopper-standard. The upper horizontal face of wheel $f'$ has a spiral flange or worm, $f^2$, formed upon it, through which motion is imparted to a worm-wheel, $g$, on a longitudinal shaft, G, mounted in suitable bearings in arms on the hopper-standard, as shown, and provided at its rear end with a bevel-wheel, $g'$, through which motion is communicated to a horizontal bevel-wheel, $g^2$, and thence, through a spiral or worm flange on the upper face of the latter, to a spur-pinion, $h$, which engages with and drives a spur-gear, $h'$, the former turning upon a pin or stud on the inner face of a dial-plate or frame, H, and the latter, $h'$, having a short stud or pin, $h^2$, (see Fig. 14,) which turns in a suitable bearing in said dial-plate. The stud $h^2$ has a socket formed in it for the reception of an elastic cushion, $h^3$, through which the screw passes for securing the index-finger $i'$ to said stud or pin, this manner of connecting the finger to its actuating shaft or wheel serving to permit its adjustment to any desired point on the dial when the gearing is at rest. $i$ is also an index-finger or pointer, secured in a similar manner to the rear end of the shaft G. The hand $i$, under the arrangement shown, may be made to indicate a single acre, and the hand $i'$, which is geared down, through the arrangement of worm and worm-wheel described, so as to move forward one point or tooth for each revolution of the shaft G, will indicate the number of acres seeded. Under the arrangement of gearing described it will be seen that whenever the seeding devices are thrown out of action the measuring devices will also be thrown out of gear.

In Figs. 6 and 7 are shown detail views of the divided distributer-wheel casing J, together with the gage for regulating the discharge of the seed. These gages $j$ are pivoted at their upper ends each to one of the casing-plates at a point above and in rear of the distributer-wheel shaft, and in such relation to the distributing-channel in the casing-plate that its swinging end moves obliquely across the discharge end of said channel and outside of the same, so that the pressure of the grain will always be at the same point, whether sowing large or small quantities. It is made in elbow or bell-crank form, and at the outer end of the arm which gages the discharge of the grain has a spur or stop, $j'$, formed upon it, which strikes against a shoulder on the casing-plate when the channel is closed, limiting the throw of the gages and facilitating its adjustment relative to the shaft which actuates it.

L is the shaft for adjusting the gages, provided with a number of crank-arms, $l$, conforming to the number of distributers employed, said arms having eyes or perforations near their outer end, which engage with conical points or spurs $j^2$, formed on the gages at or near midway of their length for adjusting them. The arms $l$ are secured to the shaft by means of thumb or set screws, which facilitate their adjustment thereon. The shaft L is provided with a crank arm or lever, L', the outer end of which passes through an eye in the short arm $m$ of a bell-crank lever, M, pivoted in the lower end of a bracket secured to the grain-box, and having a graduated quadrant-bar or dial-plate at its upper end, as shown. The long arm of the lever not only serves to adjust the gages through the connections described, but it also serves as the index-finger, indicating the position of the gages and the quantity of seed the gages are set to sow per acre through suitable figures on the dial. It is made in the form of a flat spring, provided on its inner side with a spur or tooth, which engages with a rack on the quadrant or dial plate for holding it at any desired adjustment.

The tube-top N (shown detached in Fig. $8^a$) is provided with eyes $n\ n$, either one or both of which are formed in a flat spring, $n'$, attached to said top near its upper end, as shown, for facilitating its attachment to or removal from horns or spurs $j^x$, formed on the distributer-wheel casing-plates. The forward wall of said tube-top is cut away at its upper end to admit the lower end of the casing-plates, and the lower wall of the recess thus formed has a flange, $n^2$, formed upon it, which projects forward and forms a stop, which strikes against the lower wall of the distributer-casing and limits the forward throw of the tube-top. By this arrangement it is prevented from being turned to such an angle as will cause the kinking of the conductor-tube connected to its lower end, and thereby stopping the flow of the grain.

The bottom $C^4$ of the fertilizer-hopper is of cast-iron, provided with discharge-openings in it, and having sleeve journal bearings cast upon it for the reception of the shafts of the fertilizer stirrers or distributers, the object of this construction being, first, to prevent the swelling and shrinking incident to the use of wood or wood and zinc consequent upon the moisture of the fertilizer; and, secondly, to allow the stirrers to be brought into close contact with the bottom, so as to prevent the fertilizer from packing thereon, thereby obviating the friction incident to the use of wood or zinc, where the stirrers cannot be made to move in close contact with the bottom without injuring or destroying it. The bottom $C^4$ is made a little shorter than the distance between the ends of the hopper, and rests on flanges or shoulders formed on the said hopper ends, being secured to the front and back boards of the hopper by screws, which being removed permit a slight end movement of the bottom sufficient to permit one end to escape from its supporting flange or shoulder, when the bottom can be removed without removing the hopper ends or disturbing the seeding devices, thus facilitating its renewal or repair. The pendent ears, in which the horizontal shaft operating the stirrers has its bearings, and also the journal for the lever for adjusting the slide which regulates the discharge of the fertilizer, are also cast upon or formed in one piece with the bottom $C^4$.

The stirrers O are made in form of a central hub, having arms or fingers $o$, the front edges of which are thin and sharp, said arms standing in oblique and curved lines and resting throughout their entire length on the hopper-bottom, and the lower face of these arms or blades recede thence from said edge to the rear sides of the arms, giving them a shearing form, which enables them to readily separate from the mass in the hopper all that has entered the discharge-openings, and effectually prevents any packing of the fertilizer upon the hopper-bottom. The form of these stirrers is shown in Figs. 10 and 11, Fig. 10 representing a plan or top view, and Fig. 11 a bottom view, of the same.

The central hub has a square socket formed on its lower face at $o^2$, which fits over a squared end of a vertical shaft, $p$, having its bearing in a sleeve formed in the hopper-bottom, as above described, and provided on its lower end with a bevel-wheel, P, through which motion is imparted to the stirrer by a bevel-wheel, P', on the fertilizer-distributer shaft $P^2$, which serves to operate the entire series of stirrers. This shaft $P^2$, in addition to the pendent supports or bearing-lugs formed on the hopper-bottom, as above described, has its main bearing adjacent to its actuating gear-wheel made in the form of a removable sleeve, Q, (see Figs. 2 and 3,) made separate from but attached to the hopper end in such manner that it will adjust itself to the shaft, and, being self-adjusting, secures a long and perfect bearing thereto and reduces the cost, as it can be withdrawn with the shaft and replaced with a new one without displacing the hopper end. The hopper end is provided with a box, Q', (see Fig. 4,) held in position by bolts or screws, by removing which the fertilizer-bottom can be taken off without removing the shaft or sleeve from it, thereby preventing a displacement of its parts.

The slide R for regulating the discharge of the fertilizer is made of metal, and is provided with discharge-openings $r$, corresponding with those in the hopper-bottom, and is placed under the bottom, and is held in place by the tubes or spouts S, through which the fertilizer is conducted to the tube-tops N, and thence to the drill-tube. Said slide-bar has a rack-bar, $r'$, formed upon or attached to it, through which it is adjusted by means of a lever, R', having a toothed segment, $r^2$, formed upon one end, as shown in Fig. 2. The tubes or spouts S (see Fig. 12) are recessed on their upper ends to form guideways for the slide R, and are secured to the hopper-bottom by screws or bolts, the arrangement being such that when the segment-lever has moved the slide-rack out of engagement with the segment $r^2$ the slide can be readily withdrawn, when required.

The segment-lever R' is pivoted upon a trunnion formed on the hopper-bottom, (see Figs. 2 and 15,) and the arms by which it is actuated extend in rear of the hopper over a curved plate, T, having gaged or graduated notches in its upper face, a spur or projection on the lower face of the lever engaging with said notches for holding the lever, and with it the slide R, at any desired adjustment, a spring on the upper face of the lever, and pressing against the hopper-bottom, serving to hold the lever engaged with the curved bar or plate T. The plate T is secured to the hopper-bottom by screws or bolts passing through feet at its ends, as shown.

U U' (see Figs. 1 and 13) are rocking bars, to which the drag-bars are connected alternately, for adapting them to be adjusted from a single to a double rank, or vice versa. These bars are pivoted at their ends and near their upper edges in the side frame bars at one end through socket-pieces V V' of metal, said socket-pieces being provided with curved perforated arms or ears $v$ $v'$ $v^2$ $v^3$, through which, by means of a pin or bolt, the bars can be held at any desired adjustment. Thus, when the lower edges of the rocking bars are brought together and a pin passed through the perforations in the lower overlapping arms, $v^2$ $v^3$, the hoes will be brought all into the same transverse line and there held. If, now, it is desired to give them a zigzag relation, the pin is withdrawn and the upper arms, $v$ $v'$, are rocked toward each other, and the pin is passed through perforations therein, a series of these perforations serving to separate the two ranks thus formed more or less, as may be required.

The operation of the several parts will be understood without further description.

Having now described our invention, we claim—

1. The rood-dial with its index-finger operated by gearing, substantially as described, connecting it with the driving-wheel, in combination with the acre-dial and its index-finger, connected with and operated from the shaft of the rood index-finger by means of the worm and the bevel and spur gears, arranged and operating substantially as described.

2. The tube top provided with the projecting flange $n^2$, forming a stop to limit the throw of said top, for the purpose and substantially as described.

3. The removable hopper-bottom, made shorter than the distance between the hopper ends, and supported on flanges thereon, said bottom being held in place substantially as described, whereby it is adapted to be readily removed and replaced without disturbing the hopper ends.

4. The removable hopper-bottom, having bearings for the vertical stirrer-shafts and for the horizontal shaft actuating the same, for adapting said shafts to be secured to and removed with said removable bottom, substantially as described.

5. The stirrer consisting of the central hub and the oblique and curved fingers, constructed and operating substantially as described.

6. The removable bottom to the fertilizer-hopper, provided with bearings for the fertilizer-shaft, in combination with the removable bearing attached to the hopper end, adapting said hopper-bottom to be removed without detaching said shaft therefrom, substantially as described.

7. The gear-levers provided with the irregular annular flange or yoke, in combination with the cam-plate attached to the lifting-roller shaft, and provided with the cam and spur for actuating said levers with a positive movement, substantially as described.

8. The rocking bars to which the drag-bars are connected, provided with socket-pieces, and the curved perforated arms or ears for adjusting the bars and bringing the hoes into a single or double rank, substantially as described.

In testimony whereof we have hereunto set our hands this 14th day of August, A. D. 1880.

JOHN D. OTSTOT.
ABRAHAM R. LUDLOW.

Witnesses:
A. P. LINN COCHRAN,
A. T. BYERS.